Oct. 25, 1949.  E. E. SUITER  2,485,674

NAVIGATIONAL PLOTTING INSTRUMENT

Filed May 21, 1945

Inventor
EARLE E. SUITER

By Ralph L. Chappell
Attorney

Patented Oct. 25, 1949

2,485,674

UNITED STATES PATENT OFFICE 2,485,674

NAVIGATIONAL PLOTTING INSTRUMENT

Earle E. Suiter, United States Navy

Application May 21, 1945, Serial No. 594,884

1 Claim. (Cl. 33—1)

(Granted under the act of March 3, 1883, as amended April 30, 1928; 370 O. G. 757)

The present invention relates to new and useful improvements in plotting instruments for solving various types of problems, and more particularly to improvements in a plotting board of the type employed for solving navigational problems.

In general, the invention contemplates the provision of a plotting board which includes a rotatable or otherwise movable grid mounted on a suitable form of base. The grid is provided with mutually perpendicular lines over its face and with concentric circles cutting the mutually perpendicular lines and indicating speeds. A portion of the grid is marked in degrees for a short distance on either side of a "true heading" arrow, the setting of which serves to indicate easterly or westerly variations. A transparent plotting sheet is disposed over the grid and is provided with a compass rose adapted to cooperate with settings of the grid in conventional manner. The setting and operation of the plotting instrument is more or less conventional and will not be described in detail, but it is of the type which involves the plotting of vectors from a point centrally located with respect to the grid and the compass rose. Such instruments are employed for solving wind triangles; to show course to be made good; to provide for the adding of vectors which permits interception of moving objects; to provide for reciprocal courses and changes in course permitting the execution of various search procedures, and to generally solve various navigational problems involving vector triangles.

An object of the present invention is to provide a plotting instrument of the above type which is particularly adapted for educational purposes in that instruction of students is greatly facilitated.

Another object of the invention is to provide a plotting instrument of the above type having replaceable plotting sheets to facilitate correction of problems without materially interfering with the solution of further assigned problems.

The above and other objects of the invention will in part be obvious, and will be hereinafter more fully pointed out.

Figure 1:
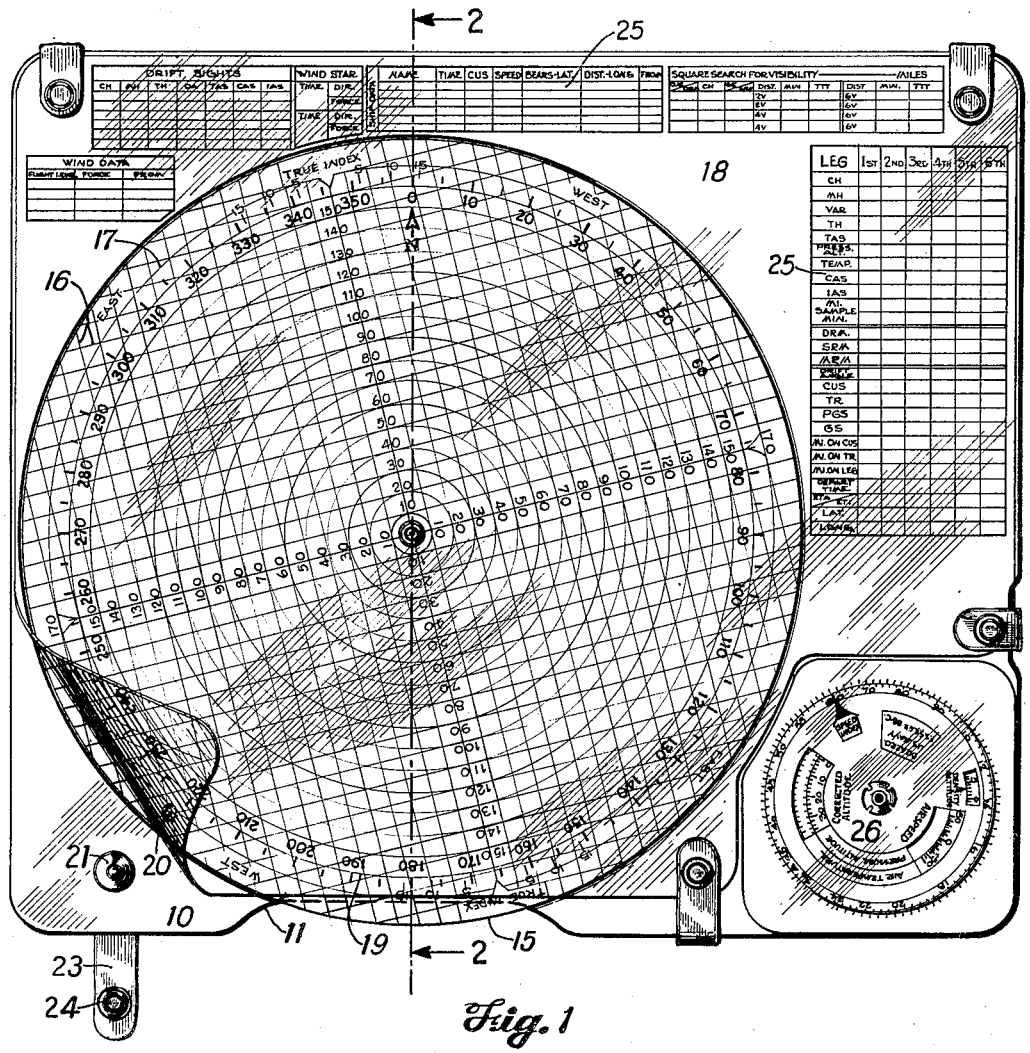
Fig. 1 is a top plan view of the plotting instrument.
Figure 2:
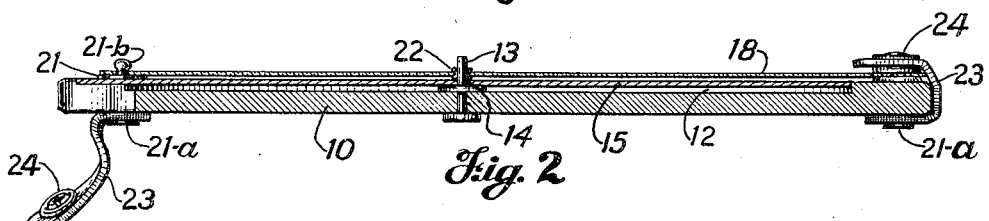
Fig. 2 is a sectional view taken substantially along line 2—2 of Fig. 1.

Referring more in detail to the accompanying drawings, the instrument includes a base member 10 of pressed wood or other fibrous material covered with Bakelite or the like, to render the same resistant to heat and moisture so that no warping will take place. The base member is substantially rectangular in configuration but is provided along one edge thereof with a cutaway portion providing a recess 11. The top surface of the base member is countersunk to provide a circular recess 12. A pivot pin 13 extends upwardly from the base member at the center of the recess 12 and is adapted to extend through an aperture 14 in a circular grid member 15 which snugly fits within the recess 12. A portion of the grid 15 extends beyond the innermost portion of the recess 11 so as to provide a convenient finger grip for turning the grid to selected positions. As previously indicated, the surface of the grid is provided with mutually perpendicular lines 16 and with concentric circles 17 which are tangent to certain of the mutually perpendicular lines at 90° intervals. On either side of the marking, "true index," the edge of the grid is marked in degrees to indicate easterly or westerly variation.

The transparent plotting sheet 18 may be made of Vinylite or similar material and is cut to substantially fit within the peripherial limits of the base member 10. Concentric with the grid 15, the plotting sheet is marked with a compass rose showing markings 19 in degrees from 0° to 360°. The plotting sheet is provided adjacent the corners thereof with apertures 20 therethrough which are adapted to receive similarly and symmetrically spaced projections 21 mounted on the base member. The plotting sheet is also provided with an eyelet 22 around an opening therethrough which coincides with the pivot pin 13 on the base member so that the plotting sheet is properly positioned over the grid. Each of several flexible straps 23 have one end thereof secured by the heads 21a of the projections 21 to the underside of the base member 10. The free end of each strap is provided with a snap fastener 24 which is adapted to snap over the upper ends 21b of the projections 21 in order to secure the plotting sheet in position.

Figure 3:
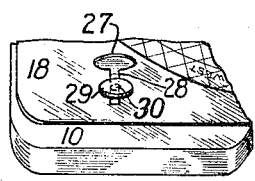
Fig. 3 is a fragmentary detail view showing another method of securing the plotting sheet to the base.

The plotting sheet 18 may be removably secured to the base member 10 in various ways. One such variation is shown in Fig. 3 in connection with one corner of the sheet. Thus, the sheet may be provided with a circular opening 27 which terminates in a rectangular opening 28. The base member carries a pin having an enlarged head portion 29 and a shank portion 30. The head 29 is slightly smaller than the opening 27 so as to pass therethrough in positioning the sheet. It is to be understood that the other fastening points are provided with the same fastening means. The shank 30 of the pin is of a diameter substantially the same as the traverse width of the opening 28 so as to snugly engage the sides thereof as the sheet is shifting to the position shown, in which position the pivot 13 will become aligned with and pass through the opening 22 in the plotting sheet 18 which will be held in properly oriented position.

From the foregoing description, it will be seen that a great variety of methods of instruction may be employed with the plotting board since the plotting sheets and the grid are removable and replaceable. Thus, charts and maps of varying details may be printed on the plotting sheets. Removal of the plotting sheets greatly facilitates correction of the student's problems in that a sheet with a solved problem may be removed and placed over the instructor's master sheet or template for comparison and correction. The student may proceed with other assigned problems by merely positioning a new plotting sheet. Correction of the problems is simplified since it is merely necessary for the instructor to mark the correct solution without erasure of the student's solution so that errors will remain apparent and can be readily analyzed. Log forms 25 and other data of various types may be printed on the plotting sheet. A standard form of computer 26 is secured to the base member at one corner thereof, the plotting sheet being cut away to accommodate the same.

While the foregoing description has been made in connection with the drawings for the purposes of illustration, it is to be clearly understood that various changes in the details of construction and arrangement of parts and operation thereof, may be made without departing from the scope of the invention set forth in the appended claim.

The invention described herein may be manufactured and used by or for the Government of the United States of America for governmental purposes without the payment of any royalties thereon or therefor.

What I claim is:

A plotting board for instructional and aerial navigation purposes comprising a base member having a countersunk circular recess in the top surface thereof, an upstanding pivot centrally located within said recess and binding posts spaced around the peripheral area of said base member, a circular disc mounted for rotation on said pivot and disposed within said recess, said disc having printed thereon a scalar rectangular grid, the central ordinate thereof being indicated as a true index line with a mile scale thereon, the central abscissa thereof at right angles to said ordinate having a mile scale thereon, circles concentric with said pivot intersecting said ordinate and abscissa at points of tangency to the other ordinates and abscissae, a magnetic variation scale on the outermost circle on either side of said true index line, a transparent plotting sheet covering said circular disc, said sheet having printed thereon a compass rose in registration with the magnetic variation scale on said disc and a map of the area to be flown over to the same scale as the underlying grid, said map oriented with respect to said grid by means of a central aperture in said plotting sheet fitting over said pivot and a plurality of apertures spaced around the periphery of said plotting sheet for engagement with said binding posts, and resilient caps flexibly attached to said base member for engagement with the upper parts of said binding posts for holding said plotting sheet thereon whereby the plotting sheet with its map printed thereon may be rapidly and easily oriented with respect to the said grid and base member and flight problems may be quickly and accurately solved.

EARLE E. SUITER.

REFERENCES CITED

The following references are of record in the file of this patent:

UNITED STATES PATENTS

| Number | Name | Date |
| --- | --- | --- |
| 2,013,603 | Dalton | Sept. 3, 1935 |
| 2,114,652 | Dalton | Apr. 19, 1938 |

FOREIGN PATENTS

| Number | Country | Date |
| --- | --- | --- |
| 429,651 | Great Britain | June 4, 1935 |
| 501,555 | France | Apr. 17, 1920 |